March 25, 1952 — G. F. SARAZIN — 2,590,579
TORSIONAL VIBRATION DAMPER
Filed June 20, 1949 — 3 Sheets-Sheet 1

INVENTOR
Gilles François Sarazin
BY
Bailey, Stephens & Huettig
ATTORNEYS

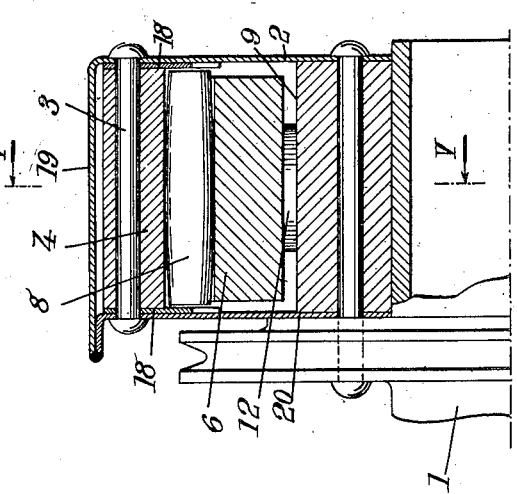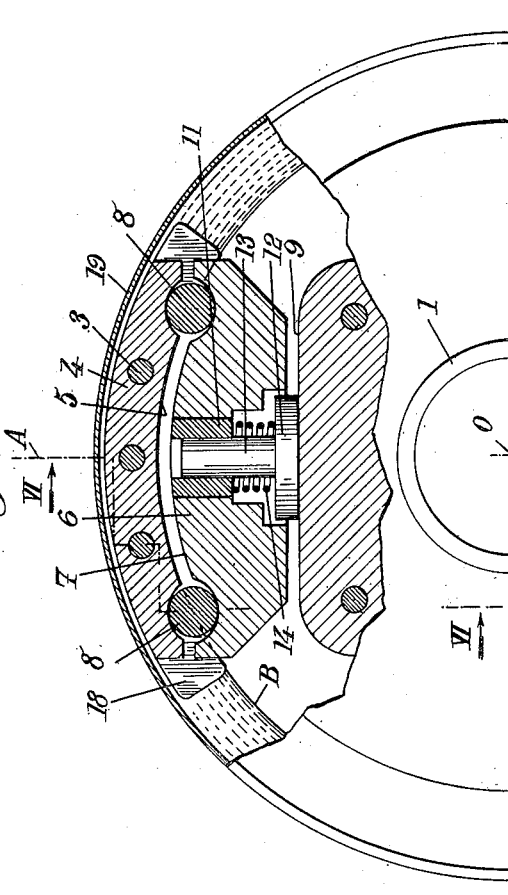

March 25, 1952  G. F. SARAZIN  2,590,579
TORSIONAL VIBRATION DAMPER
Filed June 20, 1949  3 Sheets-Sheet 3
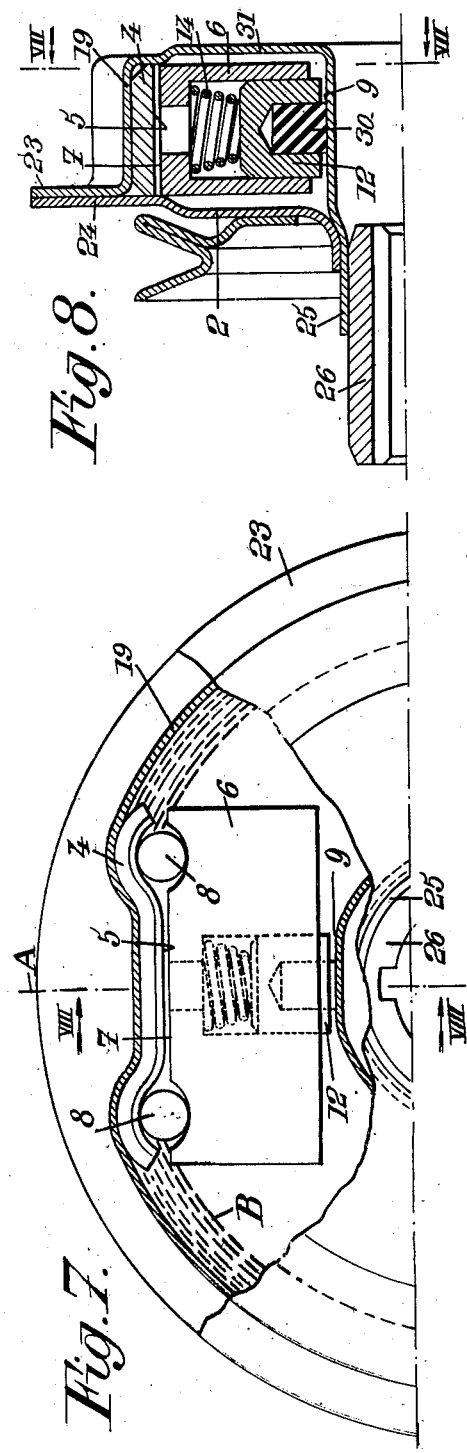
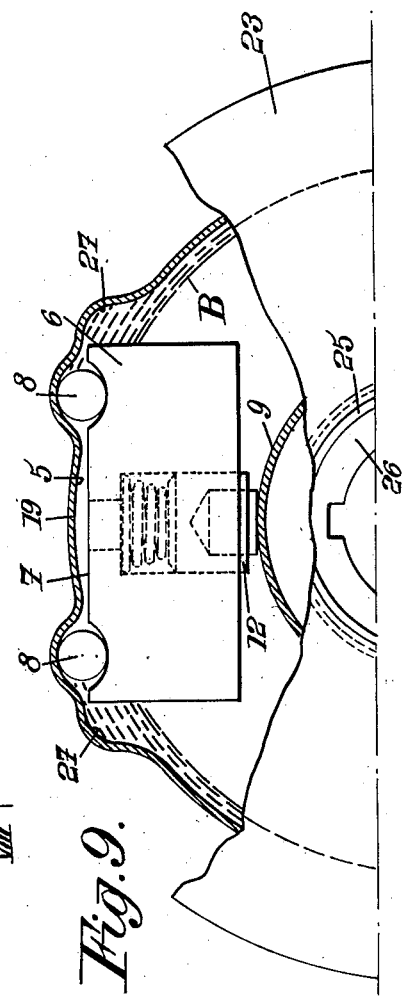
INVENTOR
Gilles Francois Sarazin
BY
ATTORNEYS Patented Mar. 25, 1952

2,590,579

UNITED STATES PATENT OFFICE 2,590,579

TORSIONAL VIBRATION DAMPER

Gilles François Sarazin, Paris, France

Application June 20, 1949, Serial No. 100,284
In France September 17, 1948

20 Claims. (Cl. 74—574)

The present invention relates to torsional vibration dynamic dampers of the type including pendular masses without return spring, for rotating shafts.

These apparatus, which are well known at the present time, were initially described, both diagrammatically and according to certain embodiments, in the French patent to R. Sarazin No. 724,234, of December 19, 1930, and in the addition thereto No. 41,251 of June 30, 1931.

Subsequently, in the Swiss patent to R. Sarazin No. 175,420, of September 1933, there was described an embodiment according to which the apparatus includes movable pendular masses connected to the vibrating part (shaft) through at least one rolling means running on the one hand on a race carried by the vibrating part and on the other hand on a race carried by the mass.

The present invention relates to these apparatus and its chief object is to provide a damper of this kind which is better adapted to meet the requirements of practice than those existing at the present time, in particular from the point of view of safety of operation and simplicity of construction.

It consists chiefly, while providing a rolling connection between the pendular mass of the apparatus and the vibrating part, in disposing said apparatus inside a fluid-tight envelope fixed to the vibrating shaft and containing an amount of lubricant such that, when the whole is rotating, the rolling means are at least partly immersed in said lubricant.

According to another feature of my invention, I dispose, in an apparatus of the type above set forth, the roller races carried by the vibrating part in at least one element secured laterally to a disc or plate fixed on the shaft, the rolling means being made of a length substantially equal to the width of said element, and means being provided for preventing lateral displacements of said rolling means.

Other features of my invention will appear from the following detailed description of some specific embodiments thereof, with reference to the accompanying drawings, given merely by way of example, and in which:

Figs. 5 and 6 are views similar to Figs. 3 and 4 showing, in section on the line V—V of Fig. 6 and on the line VI—VI of Fig. 5, respectively, an apparatus made according to another embodiment of the invention;

Figs. 7 and 8 are views similar to Figs. 3 and 4 showing, in section on the line VII—VII of Fig. 8 and on the line VIII—VIII of Fig. 7, an apparatus made according to a third embodiment of the invention;

Fig. 9 shows, similarly to Fig. 7, an apparatus made according to a fourth embodiment of the invention.

Figure 1:
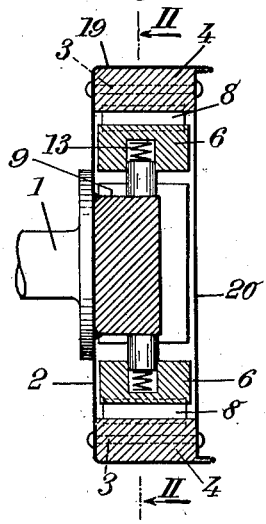
Figs. 1 and 2 show, respectively in axial section and in cross section on the line II—II of Fig. 1, a torsional vibration damper made according to the invention.
Figure 2:
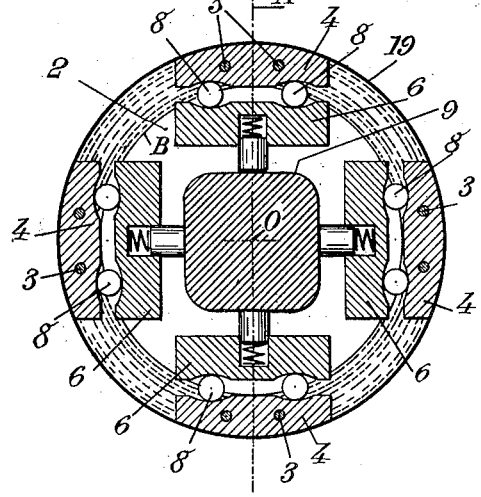

The embodiments of my invention to be hereinafter described are supposed to be applied to the case of a rotating shaft 1 subjected to the action of a periodically varying torsional perturbing influence.

I fix laterally to a disc 2 secured to shaft 1, for instance by means of rivets, or by welding, at least one element, and preferably, as shown, a plurality of blocks 4 distributed about the shaft, these blocks being, for instance, made of steel.

Each of these blocks is provided with a face 5, for instance of plane or cylindrical shape, parallel to the axis of rotation 0 of shaft 1 and disposed symmetrically with respect to the radial plane A passing through the middle line of said face 5.

This face 5 is provided with two roller races or tracks, each in the form of a portion of a cylinder of a radius equal to R (Fig. 4) and having its axis parallel to axis 0, the axes of the two roller races thus formed being symmetrical with respect to plane A.

Opposite each block 4, there is provided a mass 6, for instance also made of steel, the face 7 of which includes, formed therein, roller races identical to those formed in block 4 and disposed at the same distance from each other as said first mentioned roller races.

I interpose, between the roller races of faces 5 and 7, two rollers 8 of a radius equal to $r$, each of these rollers cooperating with corresponding roller races of elements 4 and 6. These rollers may also be made of steel.

I thus obtain a bifilar pendular suspension of each mass 6 with a radius equal to $2(R-r)$, this pendular radius being chosen, as known, in such manner that the natural period of the pendulum thus constituted corresponds to a number $n$ of oscillations, for every revolution of shaft 1, equal to the order of the periodical torsional perturbation.

It should be noted that both blocks 4 and masses 6 may be obtained very simply by cutting from rolled bars of suitable section.

In order to prevent, when the system is at rest or is rotating at low speed, play from occurring between the rollers and their races, each of the masses is advantageously arranged to cooperate with a plunger engaged in a corresponding housing of said mass, a spring being interposed between the plunger and the bottom of said housing so that, as long as the centrifugal force exerted upon said mass is below a given value, this spring applies the outer face of the plunger against the surface 9 of a block fixed to plate 2 and made for instance of a plastic material, while pushing mass 6 toward block 4 so that rollers 8 are tightly held between their races.

Preferably the whole is arranged in such manner that the plunger, in its retracted position under the effect of the centrifugal force, however comes into contact with surface 9 when the pendular amplitude of the mass exceeds the maximum value to be admitted, for instance 30°. I thus prevent the rollers from escaping from their roller races.

The plungers may be made of any suitable material but, in view of their position, it is interesting to make them of a self-lubricating porous metal, in order to ensure lubrication thereof.

According to a feature of my invention, the vibration damper, made for instance as above described, is placed inside a fluidtight envelope, preferably in the form of a body of revolution, which contains an amount of lubricant such that, when the device is rotating, the roller races carried by the vibrating part are at least partly immersed in said lubricant.

The amount of lubricant introduced into the fluid-tight envelope is advantageously chosen in such manner that when said lubricant is distributed, under the effect of the centrifugal force, in the form of a liquid annular body, the cylindrical free surface B (Fig. 4) materialized by the lubricant is so located that the rollers are at least partly immersed in the liquid, masses 6 however remaining, at least mostly, outside of the oil bath.

Thus the lubricant, which covers the roller races, ensures perfect lubrication of the contact zones between the rollers and their races, whereas the masses, which move practically entirely in air, keep a full freedom of movement.

These features may be applied in various ways.

Figure 3:
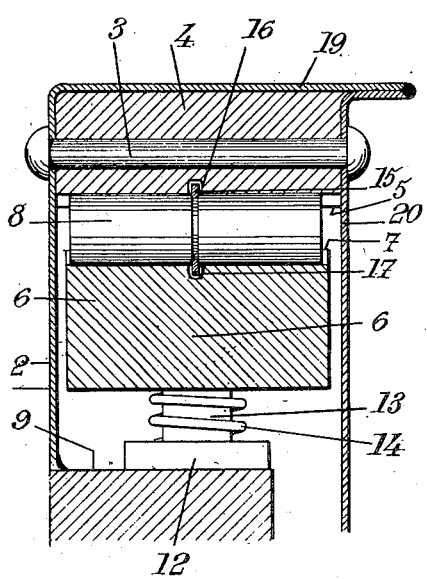
Figs. 3 and 4 are part views of the same apparatus on a larger scale, respectively in section on the line III—III of Fig. 4 and in section on the line II—II of Fig. 1.
Figure 4:
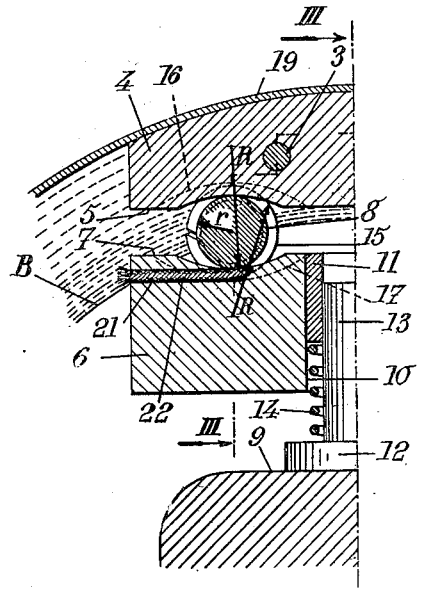

For instance, the embodiments shown by Figs. 3 and 4 on the one hand and 5 and 6 on the other hand are made, as a whole, as above described. According to this embodiment, in order to constitute the housing of the plungers, each mass is provided with a bore 10 extending throughout it and a bronze ring 11 of a height smaller than that of the bore is fixed therein so that one edge of said ring is flush with the face 7 of the mass. The plunger includes a head 12 and a stem 13 adapted to slide freely in ring 11. A spring 14, wound round stem 13, is interposed between head 12 and the corresponding edge of the ring.

In order to prevent transverse displacements of the rollers and/or of the masses, these rollers, which are made of a length substantially equal to the width of blocks 4, are provided each with an annular rib projecting from the cylindrical surface of the roller and engaging with a certain play in corresponding grooves 16 and 17 provided in the roller races of the corresponding block and mass. This rib 15 may, for instance, be constituted by an elastically deformable split ring engaged in a peripheral groove cut in the middle plane of the roller.

In order to constitute the fluidtight envelope which is to contain the vibration damper, there is provided, at the periphery of disc 2, a cylindrical flange 19 which cooperates with a cover 20, for instance of sheet metal, so as to form a closed box inside which all the elements of the damper are contained.

Finally, if the free surface B of the liquid is supposed to be such that the zones of contact between the rollers and masses 6 are not immersed in the lubricant, I provide, as shown by Fig. 4, at least one channel 21 at either end of each mass 6, this channel opening at one of its ends into the lubricant and at the other end into the bottom of the adjacent roller race, a wick 22 being advantageously provided in this channel. Lubricant is thus conveyed to the zones of contact between the rollers and the masses.

The embodiment illustrated in Figs. 5 and 6 is practically the same as that of Figs. 3 and 4 with the difference that the means for preventing transverse displacements of the rollers and/or of the masses are constituted by plates 18 tightly held between each of the faces of blocks 4 and the walls of the fluidtight envelope.

These plates may be advantageously made of tempered steel, for instance in the form of plates 1 millimeter thick, chromium plated on the inner face (which is to act as a lateral abutment for the rollers and the masses).

They may also be constituted by ordinary metal sheets lined on their inner faces with plates of chromium plated spring steel.

These plates 18 are dimensioned to form lateral abutments for the rollers and/or the masses for all the positions that may be assumed by these elements in the course of the operation of the apparatus. Anyway, the rollers can then be constituted merely by tempered steel cylinders.

In the embodiment of Figs. 7 and 8, the blocks are constituted by a mere sheet metal plate of sufficient thickness (for instance 5 mm. thick) suitably shaped to provide the necessary roller races, this plate being applied and secured by electric welding against the inner face of the peripheral wall 19 of the fluidtight envelope. This wall 19 is itself shaped in such manner that, at the places where blocks 4 are to be fixed, these two elements (wall 19 and blocks 4) are applied intimately against each other.

In this construction, each plunger 12 is in the form of a cylindrical block sliding in a corresponding recess provided in mass 6, this plunger being pushed back by a spring 14.

An abutment 30, advantageously made of rubber coated with paraffin, is inserted in such manner in the corresponding plunger 12, that it prevents direct contact between plunger 12 and surface 9. I thus avoid any noise as would be produced by plunger 12 striking surface 9.

In this embodiment, the fluidtight envelope is constituted by the assembly of two sheet metal elements one of which 31 constitutes the inner peripheral wall, one of the radial faces and the outer peripheral wall of said envelope, this element also including a radial flange 23 through which it is assembled, by electric seam welding, with the other element 24, which constitutes only the second radial/face of the fluidtight envelope. The inner peripheral wall has an extension 25 which constitutes a sleeve secured, through electric spot welding to an annular element 26 adapted to be fixed on the rotating shaft, this extension 25 being connected through electric seam welding with the inner edge of element 24.

According to this embodiment, both blocks 4 and masses 6 may advantageously be made of steel containing 0.4 per cent of carbon, blocks 4 being obtained in a press and masses 6 being constituted by sections of a bar, the roller races being merely broached without thermal treatment.

According to this embodiment, the means for preventing transverse displacements of the rollers are very simply constituted by peripheral bosses constituted when stamping the walls of the fluidtight envelope.

Thus, this envelope limits an inner chamber in the form of a body of revolution the section of which, as shown by Fig. 8, is some millimeters narrower in its peripheral zone than in the remainder of this chamber. In this peripheral zone, the transverse abutments necessary for the rollers and for the peripheral portions of the masses are constituted by the walls of the fluidtight envelope, whereas the body of said masses moves in a wider space and is thus sufficiently spaced apart from the peripheral envelope.

Finally, the embodiment according to Fig. 9 is identical to the preceding one, with the only difference that the function of blocks 4 is fulfilled by the peripheral wall 19 of the fluidtight envelope, so that blocks 4 can be dispensed with. The roller races for rollers 8 are in this case obtained directly by stamping of wall 19. If necessary, supplementary bosses 27 are provided for affording room for the oscillations of masses 6.

Of course, rollers 8, instead of being of cylindrical shape, as shown by Figs. 1 to 4, may be of elongated barrel shape as shown by Fig. 6, that is to say have slightly convex generatrices.

The rollers, or the elements forming the roller races, may be made of a self-lubricating porous metal.

The roller races, instead of having a circular-shaped generatrix, might have a generatrix of any suitable shape.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A torsional vibration damper for use on a rotating shaft which comprises, in combination, at least one vibrating block secured to said shaft, at least one pendular mass, rolling contact means interposed between said block and said mass, a fluidtight closed envelope containing said block, said mass and said rolling means, said envelope being rigid with said shaft, and an amount of lubricant in said envelope sufficient at least partly to bathe said rolling contact means without substantially bathing said mass when said envelope is rotating.

2. A torsional vibration damper for use on a rotating shaft which comprises, in combination, a disc keyed on said shaft, at least one structure secured laterally to said disc, said structure being provided with roller races, pendular masses provided with roller races, rollers interposed between said structure and said masses and arranged each to cooperate with one race of said structure and one race of a pendular mass for pendular connection of said mass with said structure, the axial length of each of said rollers being substantially equal to the width of said structure, a fluidtight closed envelope rigid with said shaft and containing said structure, said masses and said rollers, and an amount of lubricant in said envelope sufficient at least partly to bathe said rollers without substantially bathing said mass when said envelope is rotating together with said shaft.

3. A torsional vibration damper for use on a rotating shaft which comprises, in combination, means forming a fluid tight closed envelope rigid with said shaft, said envelope being provided with at least one roller race therein, a pendular mass within the envelope provided with at least one roller race, a roller interposed between said envelope and said mass and arranged to cooperate with a race of said envelope and a race of the pendular mass for pendular connection of said mass with said envelope, and an amount of lubricant in said envelope sufficient at least partly to bathe said roller without substantially bathing said mass when said envelope is rotating together with said shaft.

4. A torsional vibration damper for use on a rotating shaft which comprises, in combination, means forming a fluid tight closed envelope rigid with said shaft, said envelope being provided with roller races distributed at regular intervals about the axis of said shaft, a plurality of pendular masses provided with roller races, rollers interposed between said envelope and the masses and arranged each to cooperate both with one race of said envelope and one race of one of said masses for pendular connection of said masses with said envelope, said envelope containing said pendular masses and said rollers, and an amount of lubricant in said envelope sufficient at least partly to bathe said rollers without substantially bathing said mass when said envelope is rotated together with said shaft.

5. A vibration damper according to claim 3 in which said pendular mass is provided with two parallel roller races arranged to cooperate with rollers cooperating with two parallel roller races of said structure for bifilar pendular connection of said mass with said structure.

6. A torsional vibration damper for use on a rotating shaft which comprises, in combination, a disc keyed on said shaft, a plurality of blocks carried by said disc distributed at regular intervals about the axis of said shaft, said blocks being each provided with at least two roller races, a plurality of pendular masses, one for each block, between said blocks and the axis of said shaft, each provided with at least two roller races, rollers interposed between each block and the corresponding mass and arranged each to cooperate both with one race of said last mentioned block and one race of said last mentioned mass for bifilar pendular connection of said mass with said block, the axial length of each of said rollers being substantially equal to the width of the block with which it cooperates, a fluidtight closed envelope in the form of a body of revolution coaxial with said shaft and rigid therewith, said envelope containing said blocks, said pendular masses and said rollers, and an amount of a lubricant in said envelope sufficient at least partly to bathe said rollers without substantially bathing said mass when said envelope is rotated together with said shaft.

7. A torsional vibration damper for use on a rotating shaft which comprises, in combination, a disc keyed on said shaft, a plurality of blocks carried by said disc distributed at regular intervals about the axis of said shaft, said blocks being each provided with at least two roller races, a plurality of pendular masses, one for each block, between said blocks and the axis of said shaft, each provided with at least two roller races, rollers interposed between each block and the corresponding mass and arranged each to cooperate both with one race of said last mentioned block and one race of said last mentioned mass for bifilar pendular connection of said mass with said block, the axial length of each of said rollers being substantially equal to the width of the block with which it cooperates, a fluidtight closed envelope in the form of a body of revolution coaxial with said shaft and rigid therewith, said envelope containing said blocks, said pendular masses and said rollers, an amount of a lubricant in said envelope sufficient at least partly to bathe said rollers without substantially bathing said mass when said envelope is rotated together with said shaft, each of said pendular masses being provided with a cylindrical housing directed toward the axis of said shaft, a plurality of plungers slidable in said housings, respectively, spring means interposed between each pendular mass and the corresponding plunger for urging said plunger toward the axis of said shaft, and a piece rigid with said shaft adapted to cooperate with the inner ends of said plungers at low speeds of rotation of said shaft.

8. A vibration damper according to claim 7 further including an elastic abutment carried by the inner end of each plunger to bear against the periphery of said piece.

9. A vibration damper according to claim 3 in which the amount of lubricant inside said envelope is such that most of each pendular mass is on the outside of said lubricant when the envelope is rotating.

10. A vibration damper according to claim 6 in which the amount of lubricant inside said envelope is such that most of each pendular mass is on the outside of said lubricant when the envelope is rotating.

11. A vibration damper according to claim 3 further including means for preventing transverse displacements of said rollers.

12. A vibration damper according to claim 4 in which the envelope races and the corresponding pendular mass races have their adjacent surfaces provided with grooves located in the plane at right angles to the shaft axis which intersects in its middle part a roller interposed between said block and said mass, further including a peripheral annular rib carried by said roller and adapted to engage in both of said grooves for preventing transverse displacements of said rollers.

13. A vibration damper according to claim 4 further including abutment means carried by said envelope for preventing transverse displacements of said rollers therein.

14. A vibration damper according to claim 4 further including abutment means carried by said envelope for preventing transverse displacements of said rollers and said masses in said envelope.

15. A vibration damper according to claim 4 in which thick metal sheets are shaped to form the roller races and fixed to the peripheral part of the fluidtight envelope.

16. A vibration damper according to claim 1 further including a cylindrical sleeve coaxially fixed to said shaft about it, said envelope including a first sheet metal element constituting the inner cylindrical wall of said envelope, one of the annular plane walls thereof and the outer cylindrical wall thereof, and a second sheet metal element constituting the other annular plane wall of said envelope, the first mentioned element further including a plane flange extending along the second element and secured thereto and a cylindrical extension fixed both to said cylindrical sleeve and to said second element.

17. A vibration damper according to claim 1 further including a cylindrical sleeve coaxially fixed to said shaft about it, said envelope including a first sheet metal element constituting the inner cylindrical wall of said envelope, one of the annular plane walls thereof and the outer cylindrical wall thereof, and a second sheet metal element constituting the other annular plane wall of said envelope, the first mentioned element further including a plane flange extending along the second element and secured thereto and a cylindrical extension fixed both to said cylindrical sleeve and to said second element, the peripheral portions of the annular plane walls of said fluidtight envelope formed by said sheet metal elements being shaped to form abutment bosses adapted to prevent transverse displacements of said bosses.

18. A vibration damper according to claim 3 in which said roller races are constituted by the stamped peripheral wall of said envelope.

19. A vibration damper according to claim 3 in which each of said pendular masses is provided with a channel extending from the bottom of a roller race formed therein to one side of said mass in a zone thereof immersed in said lubricant.

20. A vibration damper according to claim 3 in which each of said pendular masses is provided with a channel extending from the bottom of a roller race formed therein to one side of said mass in a zone thereof immersed in said lubricant and a wick located in said channel.

GILLES FRANÇOIS SARAZIN.

REFERENCES CITED

The following references are of record in the file of this patent:

UNITED STATES PATENTS

| Number | Name | Date |
|---|---|---|
| 1,718,207 | Anibal | June 25, 1929 |
| 1,840,898 | Gunn | Jan. 12, 1932 |
| 2,079,226 | Sarazin | May 4, 1937 |
| 2,137,591 | Sarazin | Nov. 22, 1938 |